US007617069B2

(12) United States Patent
Alexander et al.

(10) Patent No.: US 7,617,069 B2
(45) Date of Patent: Nov. 10, 2009

(54) HANG-TIMER FOR PROVIDING RECORDING INSTRUCTIONS

(75) Inventors: Jeffrey Michael Alexander, North Bend, WA (US); Erich T. Griebling, Seattle, WA (US)

(73) Assignee: Drop Zone Corp., North Bend, WA (US)

( * ) Notice: Subject to any disclaimer, the term of this patent is extended or adjusted under 35 U.S.C. 154(b) by 0 days.

(21) Appl. No.: 11/325,212

(22) Filed: Jan. 3, 2006

(65) Prior Publication Data
US 2007/0156369 A1   Jul. 5, 2007

(51) Int. Cl.
G06F 19/00 (2006.01)
G01P 15/00 (2006.01)

(52) U.S. Cl. .................. 702/141; 702/155; 73/514.15; 396/53

(58) Field of Classification Search ............. 702/141, 702/166, 156; 73/172, 379.04, 379.05, 379.08, 73/379.01, 379, 514.15; 396/53
See application file for complete search history.

(56) References Cited

U.S. PATENT DOCUMENTS

| 3,945,646 | A | * | 3/1976 | Hammond | 473/223 |
| 5,636,146 | A |   | 6/1997 | Flentov et al. | 702/176 |
| 5,779,576 | A |   | 7/1998 | Smith, III et al. | 473/570 |
| 5,960,380 | A |   | 9/1999 | Flentov et al. | 702/178 |
| 6,073,086 | A |   | 6/2000 | Marinelli | 702/141 |
| 6,167,356 | A | * | 12/2000 | Squadron et al. | 702/166 |
| 6,496,787 | B1 |   | 12/2002 | Flentov et al. | 702/150 |
| 6,499,000 | B2 |   | 12/2002 | Flentov et al. | 702/178 |
| 6,516,284 | B2 |   | 2/2003 | Flentov et al. | 702/142 |
| 6,856,934 | B2 |   | 2/2005 | Vock et al. | 702/149 |
| 6,929,479 | B2 | * | 8/2005 | Bellows et al. | 434/251 |
| 7,272,300 | B2 |   | 9/2007 | Srinivasan et al. | 386/41 |
| 2005/0141886 | A1 |   | 6/2005 | Srinivasan et al. | 386/125 |
| 2006/0140583 | A1 | * | 6/2006 | Joh et al. | 386/83 |

OTHER PUBLICATIONS

Xu et al., 'Control System of the Self-Mobile Space Manipulator', Sep. 1994, IEEE Publication, vol. 2, No. 3, pp. 207- 219.*
U.S. Appl. No. 11/207,858, filed Aug. 18, 2005, Alexander.
U.S. Appl. No. 11/286,092, filed Nov. 23, 2005, Alexander et al.

* cited by examiner

Primary Examiner—Edward Raymond
Assistant Examiner—Elias Desta
(74) Attorney, Agent, or Firm—Woodcock Washburn LLP

(57) ABSTRACT

A hang-timer device is disclosed that is capable of issuing recording instructions to a recording device, such as a digital camera. The hang-timer can measure a static acceleration profile of a wearer of the hang-timer, and based on this static acceleration profile it can issue recording instructions to a recording device. For example, if the static acceleration profile changes from about 1 g to about 0 g, the hang-timer can issue instructions for the recording device to record; additionally, if the profile changes from about 0 g to about 1 g, it can issue instructions to stop recording. Moreover, the hang-timer can issue instructions for the recording device to record some period of time before a hang-time event and some period of time after a hang-time event. Various other such variations on the general notion described above are also disclosed.

22 Claims, 16 Drawing Sheets

Hang-Timer Displays (Examples)

"AVERAGE Hang-Time"

"TOTAL Hang-Time"

"Current Hang-Time"

"Hang-Time History"

Hang Timer Flow Chart

Pseudo Code:

Initialize Device:
 Reset HangTime
 Reset CurrentTime
 Reset BestTime
 Reset LastTime
 Reset TotalTime
 Reset DisplayDataFlag

Start:

If DisplayData Then Goto Update Display

Request 1:

Request Acceleration on Axis 1
 If Acceleration greater than 1/2 G
  Goto Start

Request 2:

Request Acceleration on Axis 2
 If Acceleration greater than 1/2 G
  Goto Start

Request 3:

Request Acceleration on Axis 3
 If Acceleration greater than 1/2 G
  Goto Start

ZeroG:

Increment HangTime
 Set DisplayData
 Goto Request1

DisplayData:

Copy CurrentTime to LastTime
 Copy HangTime to CurrentTime
 Add HangTime Counter to TotalTime If HangTime Counter to TotalTime
  Then copy HangTime to BestTime Display Times
 Clear DisplayDataFlag
 Goto Start

Fig. 6B

HANG-TIMER FOR PROVIDING RECORDING INSTRUCTIONS

CROSS-REFERENCE TO RELATED APPLICATIONS

This application is related to U.S. Non-provisional application Ser. No. 11/207,858, filed Aug. 18, 2005, titled "HANG-TIMER FOR DETERMINING TIME OF FLIGHT OF AN OBJECT," which claims priority to U.S. Provisional application Ser. No. 60/646,742, filed Jan. 25, 2005, titled "DEVICE AND METHOD FOR DETERMINING TIME OF FLIGHT OF A MOVING AND JUMPING OBJECT." This Application is also related to U.S. Non-provisional Application Ser. No. 11/286,092, filed Nov. 23, 2005, titled "ENHANCED HANG-TIMER FOR CONSOLE SIMULATION." All these applications are hereby incorporated by reference in their entirety.

BACKGROUND

Hang-time events, such as snowboard jumps or mountain bike jumps, can be exciting to experience, and they can be just as exciting to watch. This may be true whether the individual watching a hang-time event is a jumper or non-jumper, such as a spectator. Current technology allows for the recording of such hang-time events. Cameras can be used, whether digital or not, to record any exciting event in a variety of sporting activities.

Thus, it would be advantageous to provide mechanisms that can select as to when such hang-time events should be or shouldn't be recorded. Specifically, it would be advantageous to provide mechanisms for instructing a recording device to record events that are relevant to hang-timer content.

SUMMARY

Mechanisms are disclosed herein that provide recording instructions to recording devices and modules. In one aspect of the presently disclosed subject matter, a hang-timer can be used to provide such recording instructions. The hang-timer may determine, among other things, the static acceleration of the wearer of the hang-timer, and based on this measurement, it may instruct a recording module when to record a hang-time event of the wearer and when not to record the hang-time event of a wearer.

Specifically, the hang-timer can instruct a recording device, such as a digital camera, to start recording a hang-time event of a hang-timer wearer when the when static acceleration of the wearer changes from 1 g to 0 g. Additionally, it can instruct the digital camera to stop recording the hang-time event when the static acceleration changes from 0 g to 1 g. In still other aspects, it can instruct to start recording some preset time before a hang-time event and some preset time after the hang-time event.

It should be noted, that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included:

FIG. 6B is pseudo code that corresponds to the flow chart of FIG. 6A;

DETAILED DESCRIPTION

Overview

Various aspects of a hang-timer are provided, where the hang-timer is configured to provide recording instructions. At the outset, a general description of the hang-timer is given. This general description is then followed by a discussion regarding the capabilities of the hang-timer to provide recording instructions to a recording device, whether via an application programming interface (API) or otherwise. Such provided instructions may be at least partly based static acceleration data measured by the hang-timer.

Aspects of A Hang-Timer For Determining The Time-of-Flight of an Object

In one aspect of the present subject matter, mechanisms are disclosed for detecting, calculating, and displaying the time-of-flight(s) or hang-time(s) of a moving and jumping object such as, for example, a skier, snowboarder, or a mountain biker, by using, in novel ways, one or more accelerometers secured within a small wearable device. As used herein, the terms time-of-flight and hang-time are synonymous and simply refer to the amount or period of time that a selected object is not contacting or off of a surface of the earth—or any fixture attached thereto. Thus, in one aspect of the presently disclosed subject matter, a mechanism is directed to an accelerometer-based device for determining approximate time-of-flights of hang-times of a skier, snowboarder, or mountain biker who moves, jumps, and lands a plurality of times along a surface of the earth or some fixture attached thereto. A snowboarder, for example, will experience a static acceleration of (i) about 1 g when the snowboarder is contacting or on the surface, and (ii) about 0 g when the snowboarder is not contacting or off of the surface, because he or she has projected off of a jump.

Figure 1:
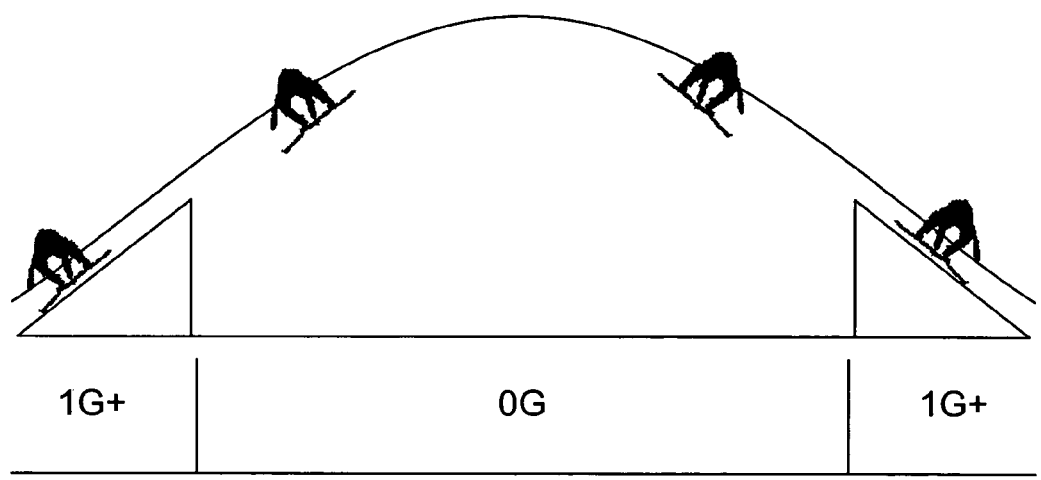
FIG. 1 is an illustration of a snowboarder (i.e., a type of jumper) moving along a surface, jumping in a trajectory, and then landing; in so doing, the snowboarder experiences a static acceleration of (i) about 1 g when he or she is contacting or on the surface and (ii) about 0 g when he or she is not contacting or off the surface.

FIG. 1 provides an exemplary illustration of a snowboarder (i.e., a type of jumper) moving along a ski slope surface, jumping in a trajectory, and then landing. By using one or more accelerometers (e.g., a tri-axis accelerometer) secured within a preferably liquid-tight housing and worn by the snowboarder (preferably near his or her center of mass), the linear or static acceleration of the snowboarder may be detected and, in turn, his or her time-of-flight or hang-time may be determined.

More specifically, the time-of-flight or hang-time of a snowboarder may be determined in accordance with the present subject matter by generating a static acceleration profile (one or more accelerometer output signals) over a period of time that includes at least one moving, jumping, and landing event; and then, appropriately analyzing the static acceleration profile.

Figure 2:
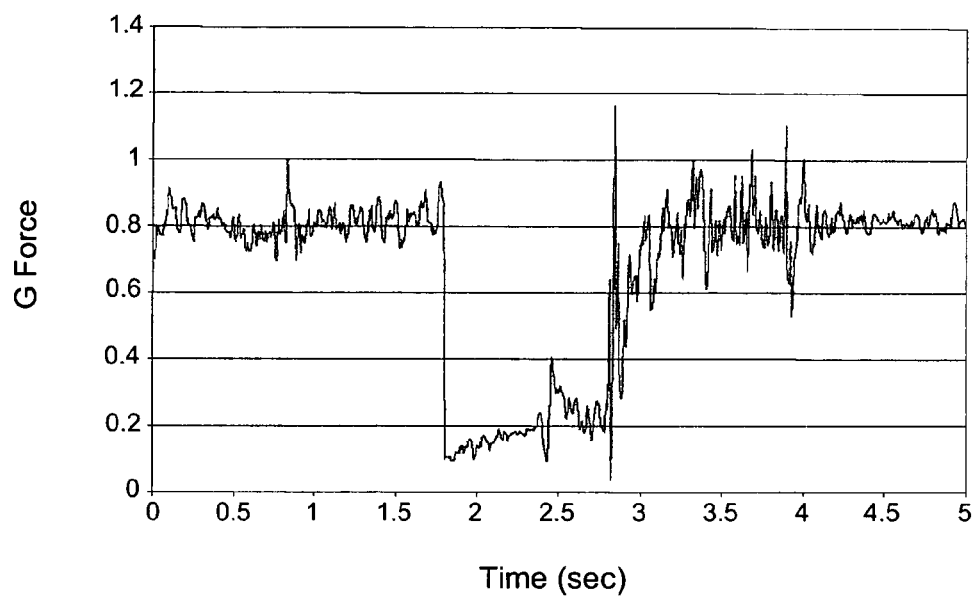
FIG. 2 is a graph showing an acceleration profile of a typical hang-time event (corresponding to the snowboarder depicted in FIG. 1), wherein the x-axis plots time in m/sec and the y-axis plots acceleration in g's.

FIG. 2 provides an exemplary graph showing the static acceleration profile (i.e., output signal of an appropriately configured tri-axis accelerometer) of the hang-time event corresponding to the snowboarder depicted in FIG. 1, where the x-axis plots time in m/sec and the y-axis plots acceleration in g's. As shown, the snowboarder experiences a static acceleration of about 1 g when he or she is moving along the surface, about 0 g's after jumping and when off of the surface, and about 1 g when he or she is again moving along the surface after landing. In view of the static acceleration profile generated by an appropriately configured and MEMS-based tri-axis accelerometer, the time-of flight or hang-time of the snowboarder may be readily calculated as it corresponds to the interval or period of time when the static acceleration output signal provides a reading of about 0 g's (as opposed to about 1 g which generally corresponds to a grounded surface experience).

Alternatively, a first and second dual axis accelerometer can be configured to detect a first, second, and third static acceleration component of the object along three mutually perpendicular axes defined as an x-axis, y-axis, and z-axis respectively. In such a scenario, a static acceleration of an object over a period of time would be equal to the vector sum of the first, second and third static, acceleration components.

Figure 3:
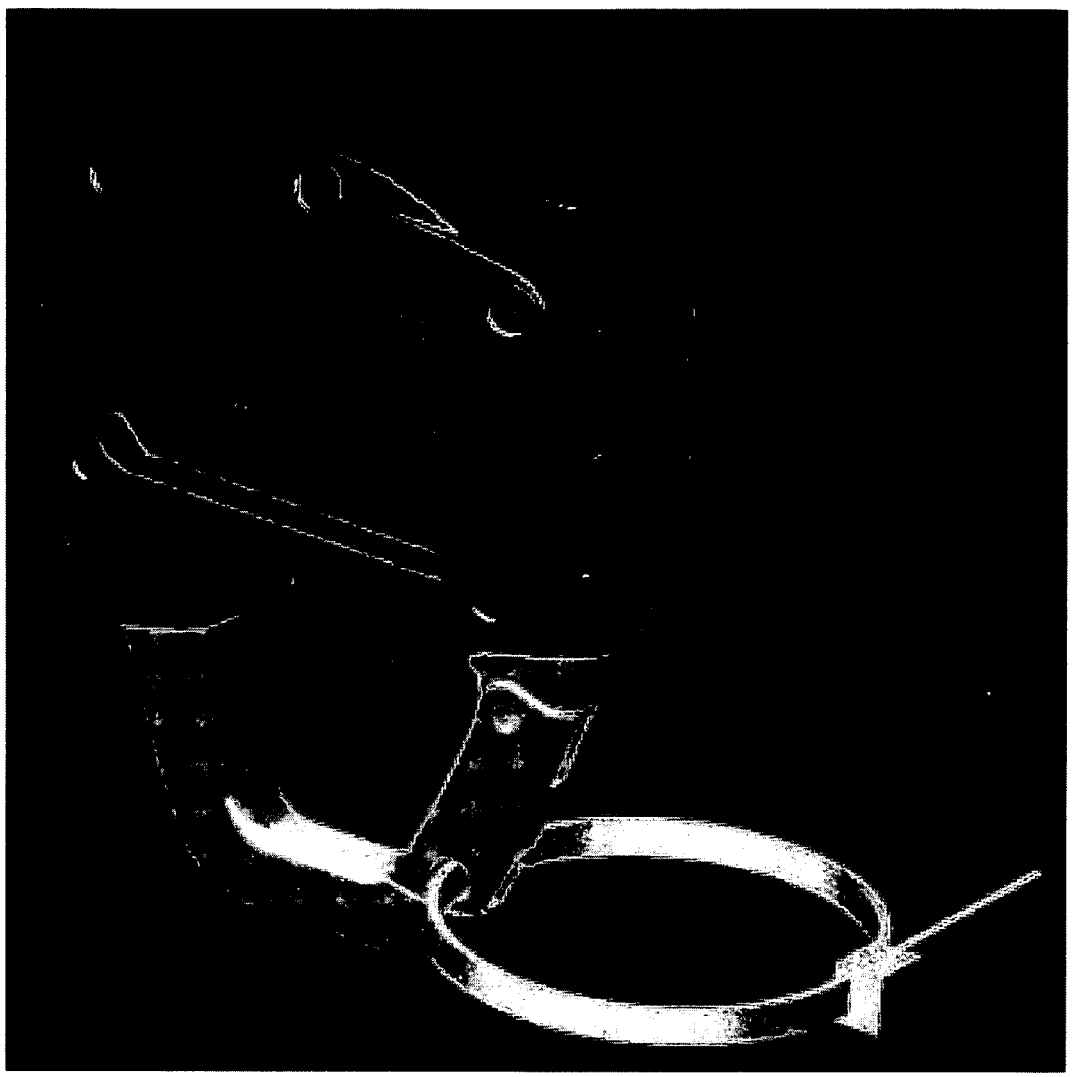
FIG. 3 is a front elevational view of a hang-timer device in accordance with one aspect of the present subject matter.
Figure 4:
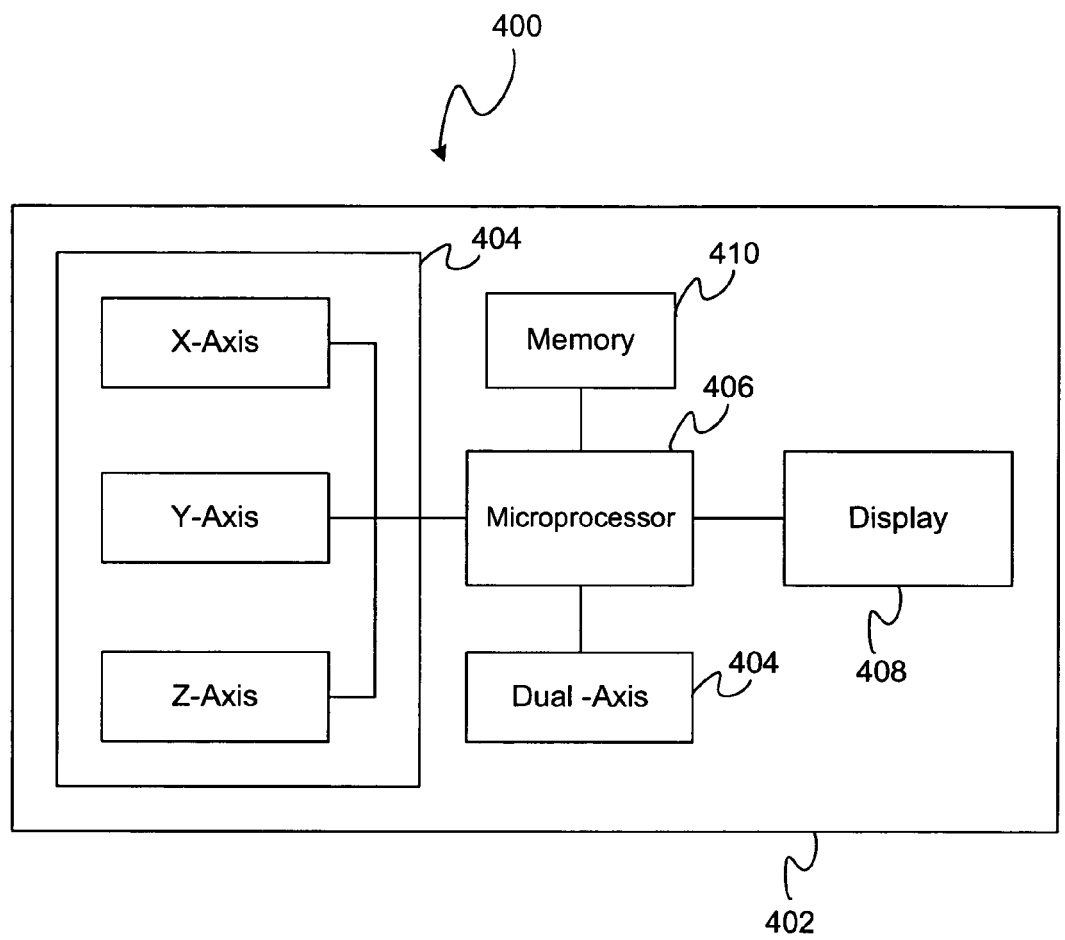
FIG. 4 is a schematic representation showing the interrelation among the various components of the hang-timer device illustrated in FIG. 3.
Figure 5A:
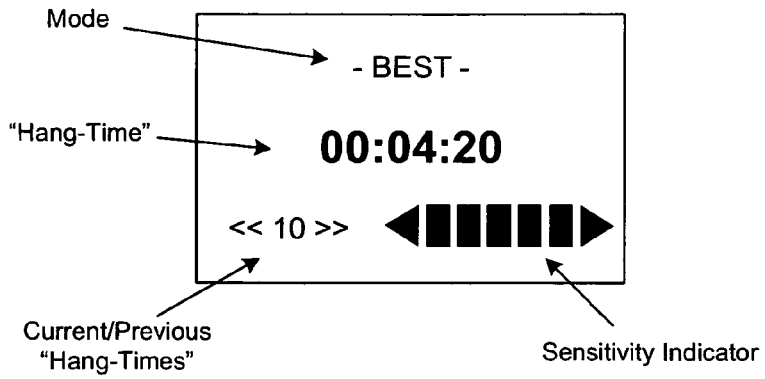
FIG. 5A illustrates a typical hang-timer display that displays the best hang-time attainted by a hang-timer wearer.
Figure 5B:
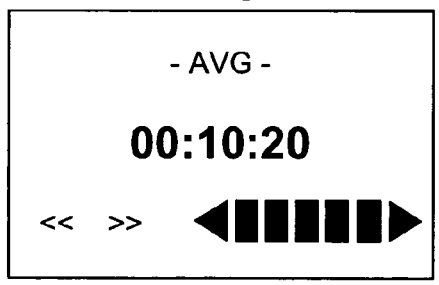
FIG. 5B illustrates the average hang-time for a hang-timer wearer, which may be the total hang-time divided by the number of jumps.
Figure 5D:
FIG. 5D illustrates the total hang-time attained by a wearer, which may be the sum of all the hang-time events - either the total per session, per day, or per any designated interval by the wearer of the hang-timer.
Figure 5C:
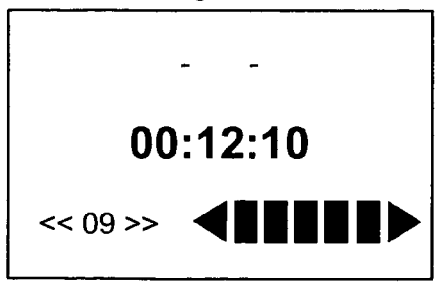
FIG. 5C illustrates a current hang-timer display, which may be the present hang-time (to be distinguished from previous hang-time events)
Figure 5E:
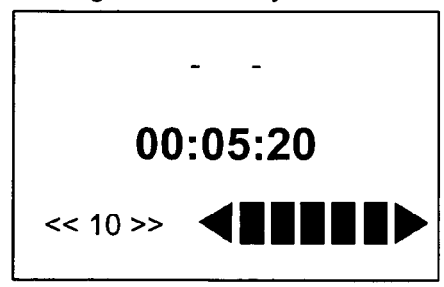
FIG. 5E illustrates the hang-time history of hang-time events, such as the tenth hang-time event out of some set of hang-time events.

Thus, and in view of the foregoing and with reference to FIGS. 3 and 4, in another aspect of the presently disclosed subject matter, a small wearable device is shown that is designed and configured to determine the approximate time-of-flight or hang-time of an object such as, for example, a skier, a snowboarder, a skater, a biker, or a jumper who moves, jumps, and lands along a surface of the earth. As shown in FIGS. 3 and 4, the device 400 comprises a housing 402; one or more accelerometers 404 (whether a dual-axis, a tri-axis, or any equivalent accelerometer) secured within the housing 402; a microprocessor 406 in electrical communication with the one or more accelerometers 404; and a display screen 408 in electrical communication with the microprocessor 406.

The housing 402 is preferably made of a two-piece rigid plastic material such as a polycarbonate. However, it may be made of a metal such as stainless steel. The housing 402 preferably encloses in an essentially liquid-tight manner the one or more accelerometers 404 and the microprocessor 406 (as well as a battery, not shown, used as the power source).

The one or more accelerometers 404 is/are preferably a single MEMS-based linear tri-axis accelerometer that functions on the principle of differential capacitance. As is appreciated by those skilled in the art, acceleration causes displacement of certain silicon structures resulting in a change in capacitance. A signal-conditioning CMOS (complementary metal oxide semiconductor) ASIC (application-specific integrated circuit) embedded and provided with the accelerometer is capable of detecting and transforming changes in capacitance into an analog output voltage, which is proportional to acceleration. The output signals are then sent to the microprocessor 406 for data manipulation and time-of-flight calculations.

In accordance with the present subject matter, the one or more accelerometers 404 are generally configured to detect the static acceleration over at least first, second, and third periods of time as the skier, snowboarder, skater, biker, or jumper (not shown) respectively moves, jumps in at least first, second and third trajectories, and lands at least first, second, and third times along the surface. In so doing, the skier, snowboarder, skater, biker, or jumper defines at least respective first, second, and third time-of-flight events.

The one or more accelerometers 404 are generally further configured to transmit at least first, second, and third accelerometer output electrical signals (not shown) that corresponds to the static acceleration of the skier, snowboarder, skater, biker, or jumper during the first, second, and third time-of-flight events. In addition, the microprocessor 406 is generally configured to calculate the approximate time-of-flight of the skier, snowboarder, skater, biker, or jumper during the first, second, and third time-of-flight events from the first, second, and third accelerometer output electrical signals respectively (which may be pulse width modulated (PWM) signals). The microprocessor 406 is generally further configured to transmit at least first, second, and third microprocessor output electrical (voltage) signals (not shown) that correspond to the calculated approximate time-of-flights of the skier, snowboarder, skater, biker, or jumper during the first, second, and third time-of-flight events.

In this regard, the microprocessor 406 is generally configured (by means of appropriate programming as is appreciated by those skilled in the art) to calculate (i) the cumulative time-of-flight associated with the first, second, and third time-of-flight events, and (ii) the greatest time-of-flight selected from the first, second, and third time-of-flight events. The microprocessor 406 is also configured to calculate (iii) the average time-of-flight of the first, second, and third time-of-flight events.

The device 400 may further comprise a memory component 410 that is in electrical communication with the microprocessor 406. The memory component 410 is generally configured to store one or more values that correspond to the approximate time-of-flights associated with the first, second, and third time-of-flight events. Moreover, the memory component 410 may be configured to store a plurality values that correspond to (i) the approximate time-of-flights associated with the first, second, and third time-of-flight events (thereby providing a history of different time-of-flights), (ii) the cumulative time-of-flight associated with the first, second, and third time-of-flight events, and (iii) the greatest time-of-flight selected from the first, second, and third time-of-flight events.

Finally, and as shown, the display screen 408 is in electrical communication with the microprocessor 406. As shown, the display screen 408 is preferably on a face of the housing 402. The display screen 408 is generally configured to display in a readable format the approximate time-of-flights associated with the first, second, and third time-of-flight events. Exemplary screen shots of several possible output displays of the display screen 408 are provided in FIGS. 5A-E.

The output displays may be liquid-crystal displays (LCDs), such as monochrome Standard LCD, with an electroluminescent backlight. The backlight can be activated when pressing a button and remain active until no buttons are pressed for several seconds. Moreover, as for the layout of the display, as is shown in FIGS. 5A-5E, the type of hang-time that can be displayed varies: it can be either the "Best" hang-time (FIG. 5A); the "Average" or "Avg" hang-time (FIG. 5B); the "Current" hang-time (FIG. 5C); the "Total" hang-time (FIG. 5D); and the "History" of hang-times (FIG. 5E), and so on.

Furthermore, the device can not only display these various times, but it can also display other information when it is used in different modes. For example, in hang-timer mode, as mentioned above, a best time, an average time, a total time, a current time, and a history of times can be displayed (additionally, as indicated above, the sensitivity of measuring hang-time can be displayed). In temperature mode, the temperature can be displayed, either in degrees Celsius or Fahrenheit, with current, low, and high temperatures. In stopwatch mode, the device provides typical features found in a stopwatch, including lap times, set times, counting times, and so on. In clock mode, the device provides typical features found in a clock or watch, including the current time, date, and so on. Finally, in set mode, the device allows the setting of times, months, years, and so on. These modes discussed above, hang-timer mode, temperature mode, stopwatch mode, clock mode, and set mode, are merely exemplary modes and other equivalent modes are provided by the device which would be apparent to any person skilled in the art.

Just as an example of one particular feature in one particular mode, the sensitivity function in the hang-timer mode allows for the adjustment of sensitivity when measuring hang-time. Thus, if the sensitivity is set on a first level, any hang-times less than 0.1 seconds are ignored. Conversely, if the sensitivity is set on a fifth level, any hang-times less than 2 seconds are ignored. Of course, there are intervening levels between the first and the fifth level, with corresponding time intervals. Furthermore, the 0.1 seconds and 2 seconds values for the first and fifth levels, respectively, are just exemplary, and may be adjusted and set differently depending on the context in which the device is used. For example, the device may have different levels of sensitivity for snowboarding than for mountain biking.

In another aspect, the present subject matter is directed to methods for determining approximate time-of-flights of a skier or snowboarder (as well as a skater, a biker, or a jumper depending on the scenario) who moves, jumps, and lands a plurality of times along a surface. The method of the present subject matter generally comprises at least the following steps: detecting by use of one or more accelerometers secured within a housing the static acceleration of a skier or snowboarder over a first period of time as the skier or snowboarder moves, jumps in a first trajectory, and lands for a first time along a surface thereby defining a first time-of-flight event; calculating from the detected static acceleration over the first period of time the approximate time-of-flight of the skier or snowboarder during the first time-of-flight event; detecting the static acceleration of the skier or snowboarder over a second period of time as the skier or snowboarder moves, jumps in a second trajectory, and lands for a second time along the surface thereby defining a second time-of-flight event; calculating from the detected static acceleration over the second period of time the approximate time-of-flight of the skier or snowboarder during the second time-of-flight event; comparing the calculated approximate time-of-flights of the skier or snowboarder over the first and second period of times, and determining one or both of (i) the cumulative time-of-flight over the first and second period of times, and (ii) the greater time-of-flight selected between the first and second time-of-flight events. The cumulative and greater time-of-flights may then be displayed on a display screen situated on a face of the device as (i) a first numeric value representative of the cumulative time-of-flight, and (ii) a second numeric value representative of the greater time-of-flight.

In further aspect of this method, the calculated approximate time-of-flights of the skier or snowboarder over the first and second period of times may be compared so as to determine (iii) the average time-of-flight over the first and second period of times. The average time-of-flight may then be displayed on the display screen as (iii) a third numeric value representative of the average time-of-flight.

In still further aspects of this method, the static acceleration of the skier or snowboarder over a third period of time is detected as the skier or snowboarder moves, jumps in a third trajectory, and lands for a third time along the surface thereby defining a third time-of-flight event. In this aspect, the additional steps comprise at least: calculating from the detected static acceleration over the third period of time the approximate time-of-flight of the skier or snowboarder during the third time-of-flight event; comparing the calculated approximate time-of-flights of the skier or snowboarder over the first, second, and third period of times, and determining (i) the cumulative time-of-flight over the first, second, and third period of times, and (ii) the greatest time-of-flight selected from the first, second, and third time-of-flight events; and displaying on the display screen (i) a fourth numeric value representative of the cumulative time-of-flight, and (ii) a fifth numeric value representative of the greatest time-of-flight. The calculated approximate time-of-flights of the skier or snowboarder over the first, second, and third period of times may then be compared to determine (iii) the average time-of-flight over the first, second, and third period of times. The average time-of-flight may then be displayed on the display screen as (iii) a sixth numeric value representative of the average time-of-flight over the first, second, and third period of times.

In yet another aspect, computer readable instructions are used for determining the time-of-flight of an object. The computer readable instructions are implemented in any type of device which might benefit from the measuring of time-of-flight, whether the device is a hang-timer device, a cellular phone, or an MP3 player. For example, a cellular phone might employ the computer readable instructions so that vital hardware is protected (shut-off or locked, as may be the case) before the cellular phone drops to the ground. Having the ability to measure changes in static acceleration may be vital in protecting such a device.

Thus, the computer readable instructions may comprise of measuring a first static acceleration and a second static acceleration using an accelerometer, and then computing a first change in magnitude from the first static acceleration to the second static acceleration, where the first change in magnitude corresponds to a take-off event of an object (for example, when the cellular phone falls out of the hands of an individual) and computing a following second change in magnitude from the second static acceleration back to the first static acceleration, where the second change in magnitude corresponds to a landing event of the object (when the cellular phone hits the ground). The same technology may be used to protect MP3 players and all other kinds of devices, whether CD players, gaming devices, and other equivalent electronic devices which may benefit from knowing beforehand when they will hit the ground.

Figure 6A:
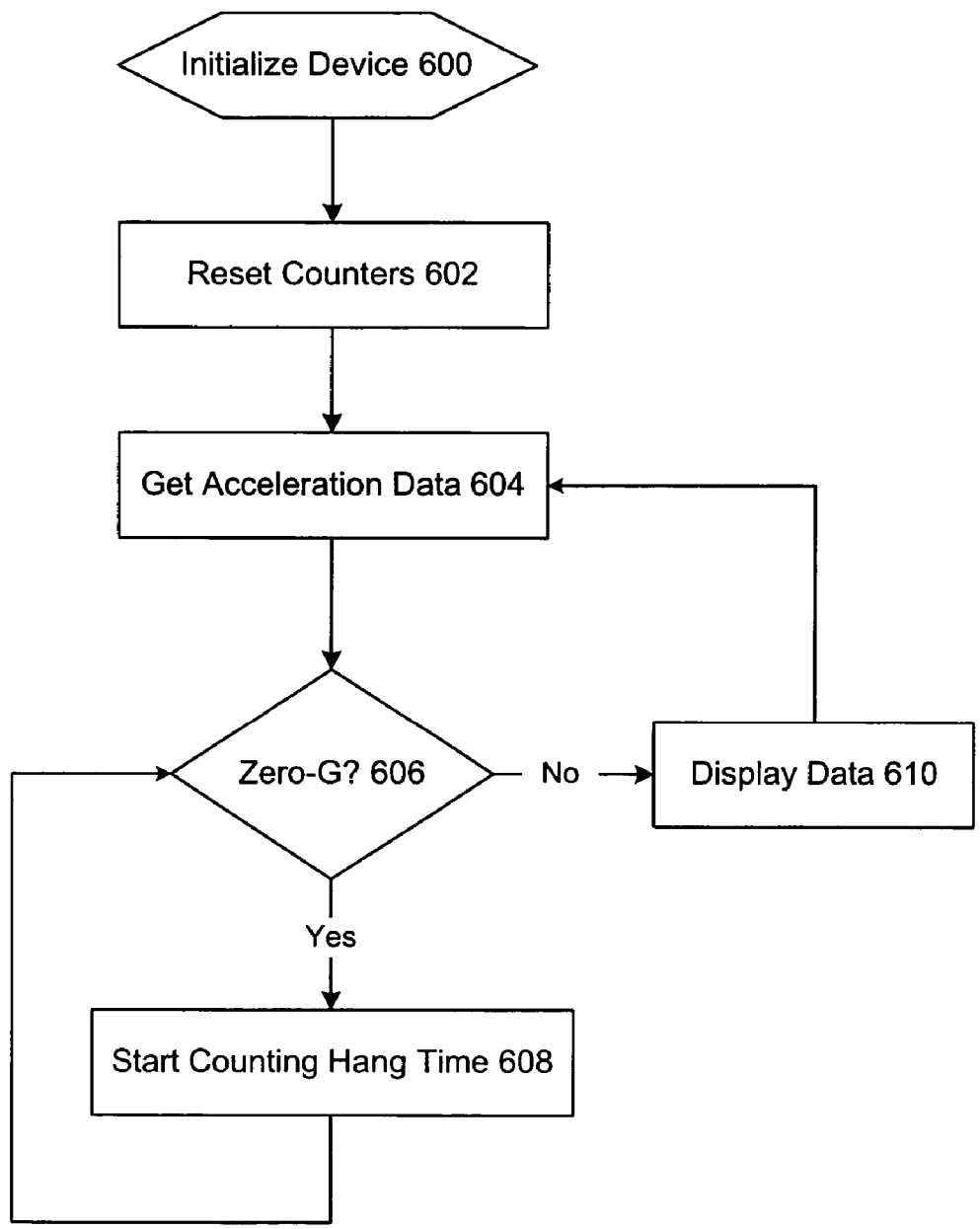
FIG. 6A is a high level flow chart that depicts certain steps associated with calculating the time-of-flight or hang-time of an object in accordance with an aspect of the present subject matter.

A high level flow chart that depicts certain steps associated with calculating the time-of-flight or hang-time of an object in accordance with an embodiment of the present subject matter has been provided as FIG. 6A. The device is initialized 600 and any counters are reset 602. Next, the static acceleration data is gathered 604 and either there is a zero gravity condition 606 or there is not. If there is a zero gravity condition 606, the hang-time is counted 608. The hang-time is counted 608 and static acceleration data is gathered 604 until the zero gravity condition 606 does not exist anymore. Once there is no more zero gravity 6006, the hang-time is displayed 610, since in such a situation a user of the device must be on the ground. Exemplary pseudo code that corresponds to the flow chart of FIG. 6A has been provided as FIG. 6B.

Figure 7B:
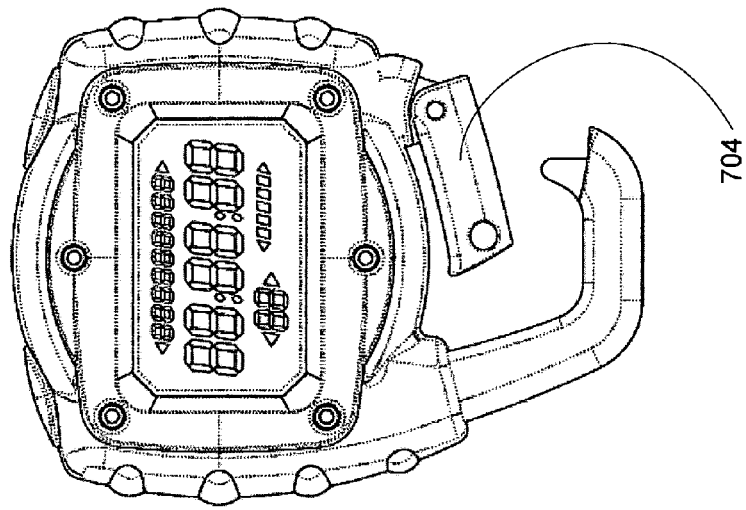
FIG. 7B illustrates the binding mechanism in the open position so that the hang-timer wearer can latch the hang-timer onto herself.
Figure 7A:
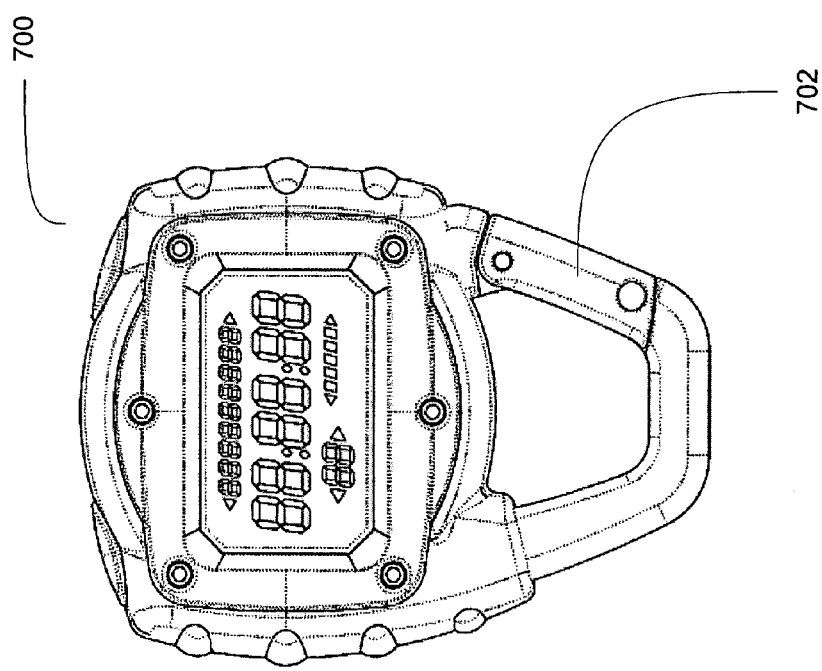
FIG. 7A illustrates a biding or latching mechanism that may be used as part of the hang-timer device.
Figure 7C:
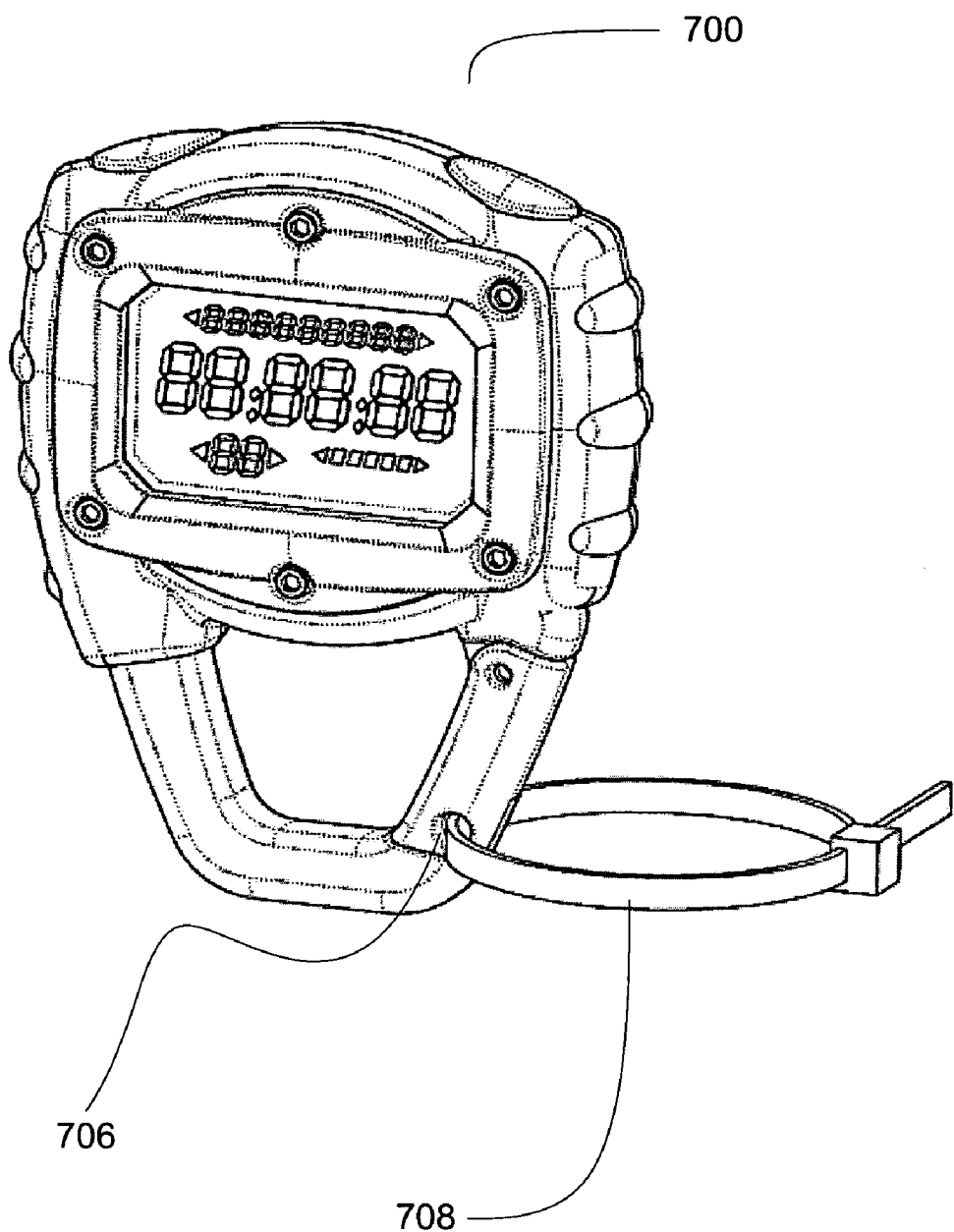
FIG. 7C illustrates a securing mechanism, in addition to the binding mechanism depicted in FIGS. 7A and 7B, in order to ensure that the hang-timer is secured to the wearer so that it cannot detached from the wearer.

In another embodiment, FIGS. 7A-7C depict a biding or latching mechanism with a securing mechanism that may be used as part of the hang-timer device. For example, FIG. 7A shows that the latching mechanism can be a carabiner clip 702, and FIG. 7B shows how that the carabiner clip opens up 704 so as to either attach the hang-timer 700 to a wearer or detach the hang-timer from a wearer. Interestingly, FIG. 7C illustrates that the securing mechanism may be a tie wrap 708. An aperture 706 in the carabiner clip allows the tie wrap 708 to secure the hang-timer 700 to a wearer. Such securing may ensure that the hang-timer is not merely thrown-up in the air to record a hang-time that was not actually obtained by the wearer. Thus, in one context, the securing mechanism may be construed as an anti-cheating mechanism, ensuring that the only hang-times that will be recorded are those actually obtained by the wearer of the hang-timer. However, the latching and securing mechanisms may be used for other purposes, as will be readily recognized by those skilled in the art.

Aspects of the Hang-timer Configured to Provide Recording Instructions

In another aspect of the presently disclosed subject matter, a recording device (or a recording module, if the recording is performed by software instead of hardware, as in this aspect), such as a digital camera, still camera, or a video camera, etc., can be used in conjunction with a hang-timer in order to record hang-time event content. The hang-timer, as disclosed in the above mentioned related applications, determines the hang-time of a wearer (or user) of the hang-timer, by determining the static acceleration. Thus, if the static acceleration of the wearer changes from 1 g to 0 g, an assumption can be made that the wearer is lunching into a jump and is airborne; alternatively, if the static acceleration changes from 0 g to 1 g, an assumption can be made that the wearer has landed a from a jump and is no longer airborne.

The measurements made by the hang-timer can be outputted and used as signals to instruct a recording device in real time when to record and when not to record. For instance, the hang-timer can instruct the recording device to start recording, say, five seconds before a jump, and five seconds after a jump, in order to record an approach to a jump, the jump itself, and the landing of the jump. In other words, the recording device can start recording five seconds before the static acceleration detected by the hang-timer changes from about 1 g to about 0 g, and the recording device can stop recording five seconds after the static acceleration changes from about 0 g to 1 g.

Figure 8:
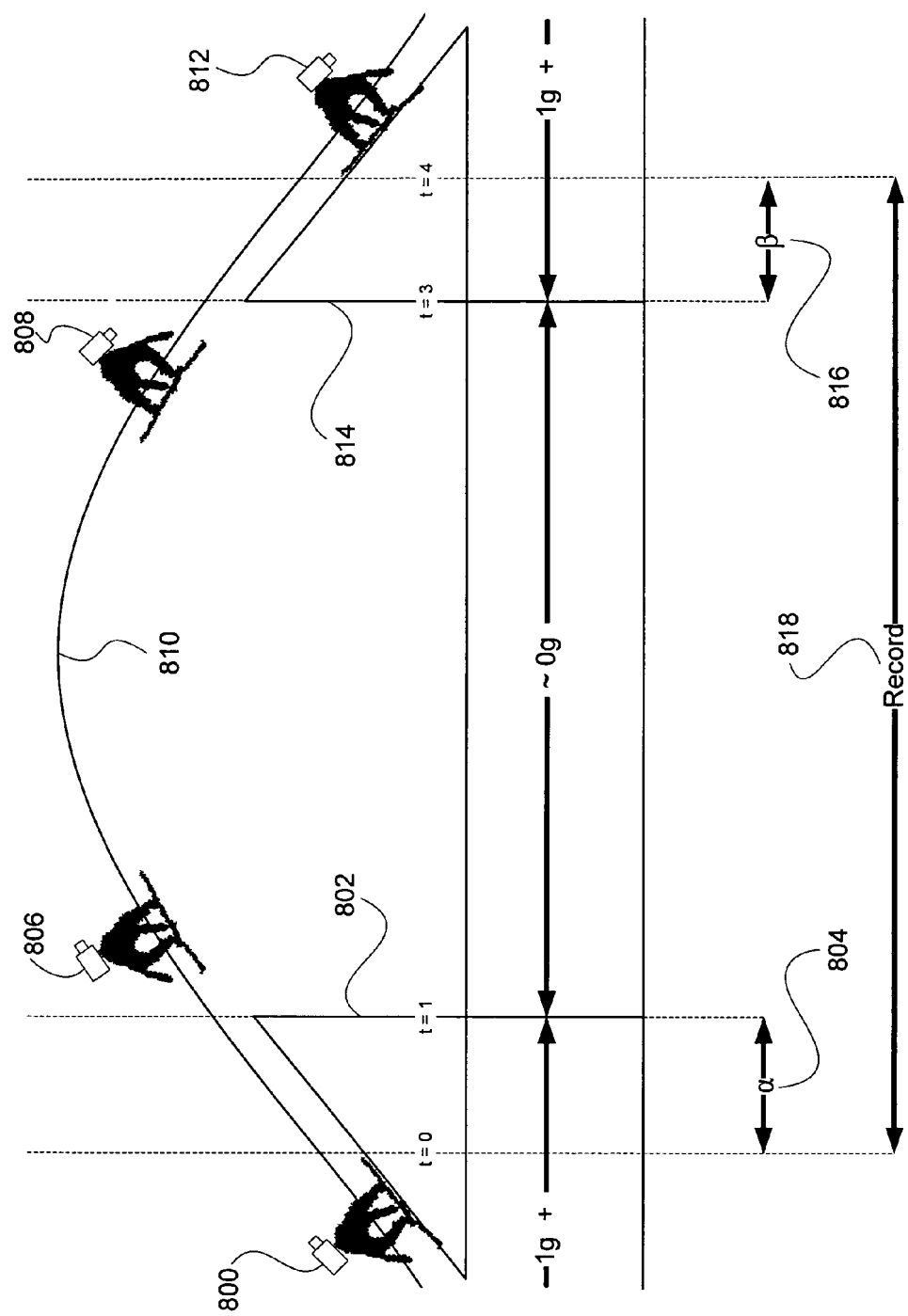
FIG. 8 illustrates a jumping profile of a hang-timer user, where the user has a mounted recording device, such as a camera, which is located either on the helmet of the user, the body, the board, or elsewhere, and the camera is activated by the hang-timer based on changes in detected static acceleration.

FIG. 8 illustrates a jumping profile of a hang-timer user, where the user has a mounted recording device, such as a camera, which is located either on the helmet of the user, the body, the board, or elsewhere, and the camera is activated by the hang-timer based on changes in detected static acceleration.

Per FIG. 8, a hang-timer user (which may be a snowboard jumper) with a mounted camera 800, starts out on a ramp 802. At time t=0, a mounted camera 800 can start recording the jump of the user. The interval between the start of the recording and the actual jump off of the ramp 802 may be some arbitrary interval, say, α804 which may be five seconds—as discussed above. When the user 806 is in the air the camera can keep on recording as the user 808 flies through some trajectory 810 and is about to land. As the user 812 lands on the ground again 814, at time t=3, the camera can keep recording until some time after the landing, at time t=4.

This interval between t=3 and t=4, β816, can again be five seconds—or any interval of interest, which may either be set by the hang-timer manufacturer or user. Thus, the total time recorded 818 may include the time before the jump, α804, the time after the landing β816, and the time the user is actually in the air and not touching the ground (the 0 g time interval). Those of skill in the art will appreciated that various set-ups of when to record or not to record may be used.

Figure 9:
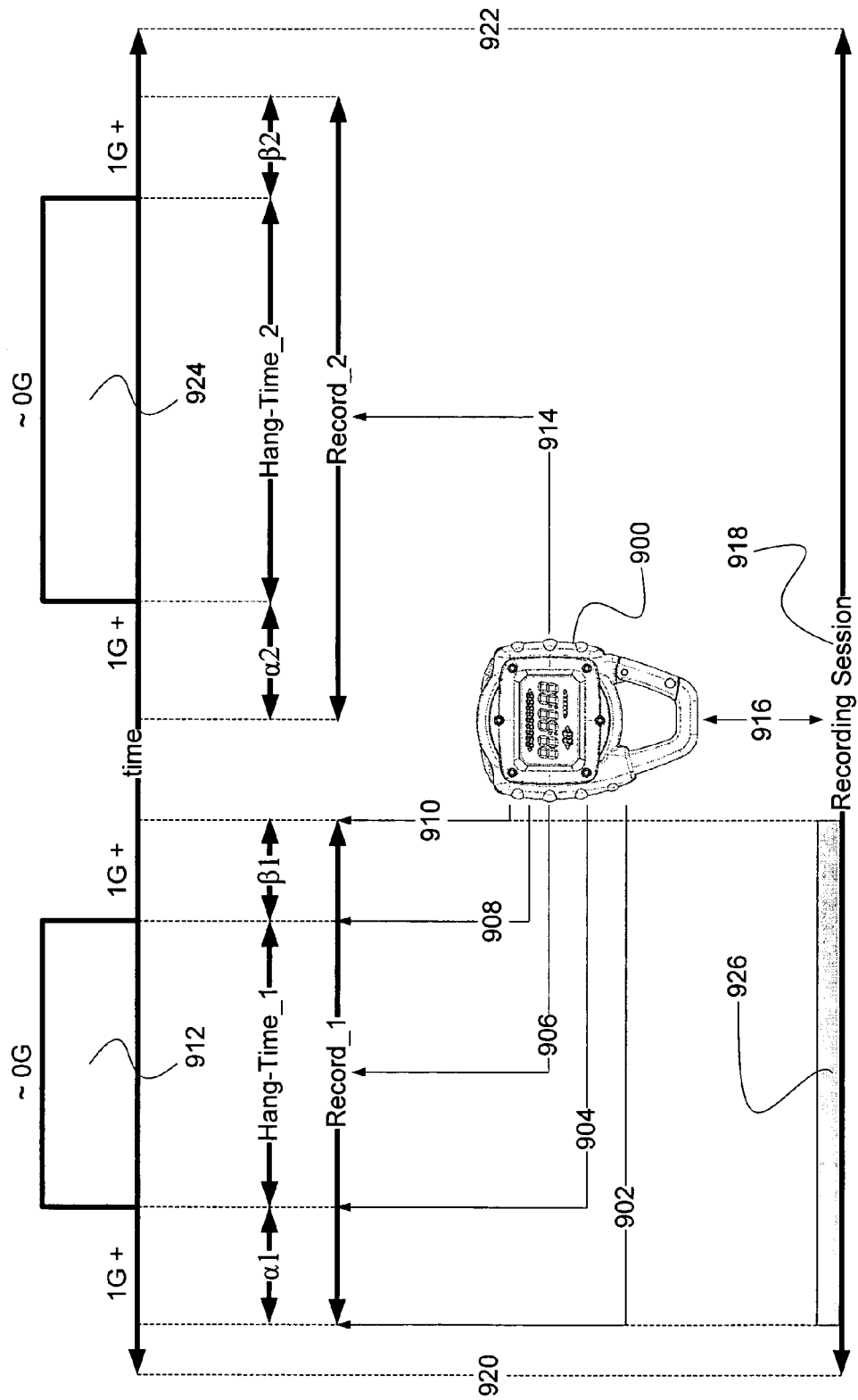
FIG. 9 illustrates various ways in which the camera may record hang-time events based on a static acceleration profile.

Next, in another aspect of the presently disclosed subject matter, FIG. 9 illustrates the various regimes that can be used in dictating recording time by the hang-timer 900. For instance, in a simple scenario, the hang-timer 900 can tell a recording device to start 904 recording when the static acceleration changes from 1 g to 0 g, and to stop 908 recording when it changes from 0 g to 1 g.

In another scenario, discussed above, the hang-timer can instruct the recording device to start 902 recording some time (α1) before the jump 912 and to stop 910 recording some time (β1) after the jump 912. This process can be repeated multiple times, so that there can be various recording times, such as Record_1 906 and Record_2 914. These recording times may be longer than the corresponding hang-time events, such as Hang-Time_1 and Hang-Time_2, respectively, or they may be shorter, or they may be equal in length, depending on the instructions that the hang-timer 900 gives.

In this set-up, what is actually happening is that the hang-timer 900 is directing when the recording device should start recording (either at time 902 or 904) and when it should stop recording (either at time 908 or 910). However, in a different set-up, the hang-timer can instruct 916 which already recorded content in a recording session 918 should be saved or selected for broadcast (and which content should not be so used). This set-up may be useful in the situation where the hang-timer 900 may not know in advance when a hang-time event, such as a jump, will happen, and hence it can not start recording five seconds before a jump 912 occurs. Put another way, by the time there is an appropriate change in static acceleration, it may be too late to start recording something that happened five seconds ago.

To remedy this problem, a recording session 918 of an entire run, from 920 to 922, involving multiple hang-time events 912 and 924, can be accessed 916 by the hang-timer 900. The hang-timer 900 can determine which portions 926 of the recording session 918 should be used based on the changes in static acceleration—for instance, at instances 902 and 910. Thus, only the relevant portions of the recording session 918 can be selected and broadcast for viewing at some location (as discussed in more detail below). For example, portions 926 of the recording session 918, totaling some seconds before a jump, during the jump, and some seconds after the landing, can be selected.

One way to implement this aspect of the presently disclosed subject matter, would be synchronize the times of the hang-timer 900 and the recording device (not shown), such that the hang-timer 900 would know which times to select from the recording device. For example, if the hang-timer 900 and the recording device both started at time t=0, the former measuring static acceleration and the latter recoding hang-time event content, if at time t=x some hang-time event occurs and ends at t=y, the hang-timer 900 may want to select data from the recording session 918 of the recording device, say, from times x−Δ to y+Δ, where Δ may be the time before the jump, and also the time after the landing—which may be, for example, five seconds.

Whether the hang-timer 900 directly instructs the recoding device when to start and stop recording, or if the hang-timer 900 selects potions 926 of recording device recording sessions 918, this much is implementation specific. Various other regimes may be used which may enable the hang-timer 900 to select the recorded content that it wants. It should be noted that in the first instance, where the hang-timer 900 instructs the recording device when to record, all the recorded content may be all the relevant content. In the second instance, where the hang-timer 900 selects portions 926 of the recorded session 918, only some of the total recorded content may be relevant content—that is, the relevant content is the content selected by the hang-timer 900.

In an alternative aspect of FIG. 9, the hang-timer 900 may use a buffer to record data for a selected time interval. For example, the hang-timer 900 can use a first-in, first-out (FIFO) buffer to record and keep storing, say, 10 seconds of data at any given time, and if a hang-time event occurs, it can select the last 5 seconds of that data that corresponds to the 5 seconds before a hang-time event. By so doing, the hang-timer can show the 5 seconds before the hang-time event even though it may not know in advance when the hang-time event will occur. Those of skill in the art will appreciate the different kinds of buffers that may be used, such as ring buffers, to perform this function. Moreover, different types of memory can be used to store buffered data, such as secure digital (SD) cards or other flash memories and their equivalents.

Figure 10:
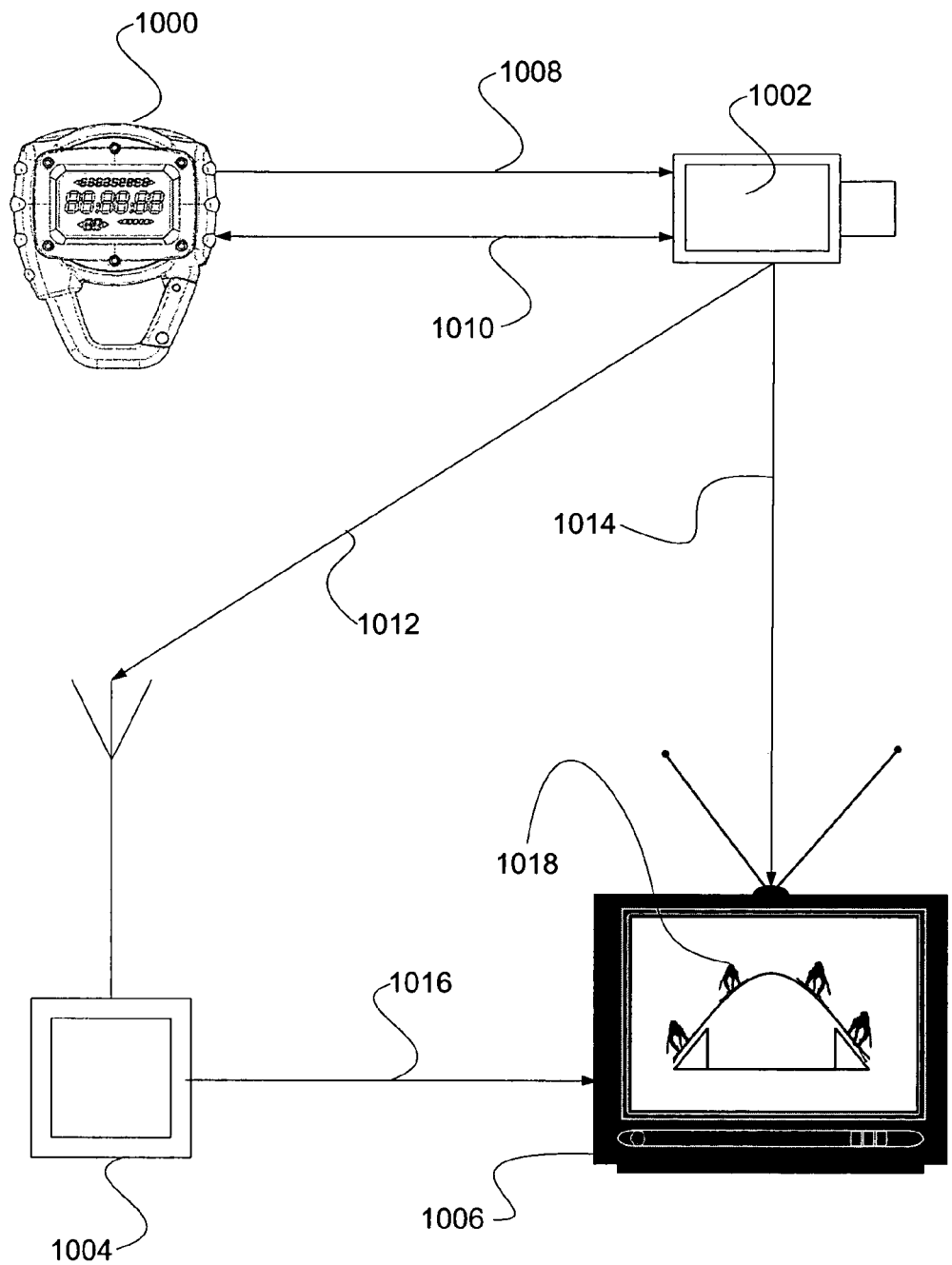
FIG. 10 illustrates one exemplary relationship between a hang-timer, a recording device, a broadcasting or relaying station, and a viewing location.

In another aspect of the presently disclosed subject matter, in FIG. 10, one exemplary relationship between a hang-timer 1000, a recording device 1002, a broadcasting or relaying station 1004, and a viewing location 1006 is illustrated. A hang-timer 1000 can instruct 1008 the recording device 1002 when to record. The hang-timer 1000 can also synchronize 1010 with the recording device 1002 per the discussion above.

In either case, once the recording device 1002 is recording, it can either broadcast 1012, 1014 its recorded data (whether saved, buffered, or live) directly to some viewing location 1006. This can be accomplished by first broadcasting 1012 to a station 1004 and then broadcasting 1016 to the viewing location 1006, or alternatively, directly broadcasting 1014 to a viewing location 1006. In either case, the hang-timer 1000 can determine which data is ultimately displayed 1018. Furthermore, the data that does get displayed 1018, may identify the individual to whom the data (or hang-time event) belongs, since the hang-timer 1000 can be personalized and thus identify the hang-timer wearer or user.

Figure 11:
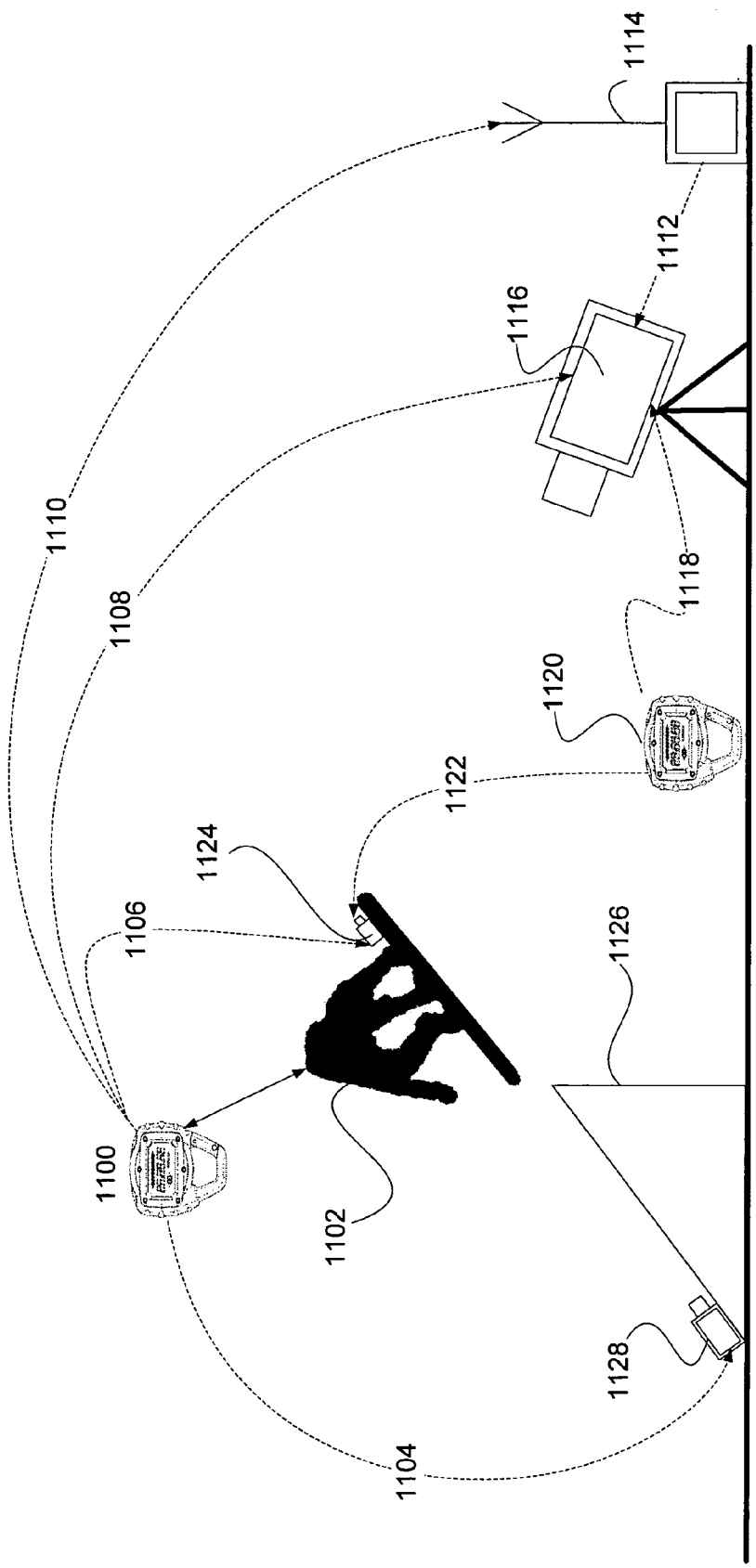
FIG. 11 illustrates the notion that the hang-timer can control various recording devices in various ways.

FIG. 11 illustrates the notion that a hang-timer 1100 can control various recording devices in various ways. For example, a hang-timer 1100 attached to a wearer/jumper 1102 can control 1104, 1106, 1108, 1110 various cameras and provide information to various broadcasting stations. The hang-timer 1100 can instruct a ramp-based camera 1128 to start recording the jumper 1102 as the jumper 1102 jumps through the air. If the ramp-based camera 1128 is used, the hang-timer 1100 may instruct the camera 1128 to record only the upward trajectory, since the downward trajectory of the jumper 1102 may not be visible from the ramp 1126 by the ramp-based camera 1128—and hence this content may be pointless to record.

One way that the hang-timer 1100 can make a determination of when the jumper 1102 is entering a downward trajectory, which might prompt the stopping of recording, is by using an altimeter that can report when a change of altitude is downward—as is disclosed in the above referenced related applications, which teach the use of not only altimeters in conjunction with the hang-timer, but also magnetometers, global positioning (GPS) devices, and the like. In short, the hang-timer 1100 may not only use its accelerometers to measure static acceleration, and based on this measurement instruct recording devices when to start and stop recording, but also may use other components.

Next, the hang-timer 1100 can also instruct recording times for cameras 1124 that are bound to the jumper 1102 jumping vehicles, such as snowboards (or to the jumper 1102 himself, if the camera 1124 is mounted to the jumper's 1102 helmet). In contrast to the ramp-based cameras 1128, the snowboard-based cameras 1124 may want to record the entire trajectory of the jumper 1102. This means that the hang-timer 1100 can take into account various recording devices and issue specialized recording instructions to each recording device. For example, if the hang-timer 1100 knows it is interfacing with a ramp-based camera 1128, it may issue record-only-on-upward-trajectory instructions, whereas if it knows that it is interfacing with a snowboard-based camera 1124, it may issue record-the-whole-trajectory-of-the-jump instructions.

The hang-timer 1100 can instruct recording devices either directly or indirectly. For instance, the hang-timer 1100 can directly instruct 1108 a ground-based camera 1116 to record the jumper 1102. Or, alternatively, the hang-timer 1100 can first send the instructions 1110 to a receiving station 1114, and that station 1114 can relay the instructions 1112 to the camera 1116. The camera 1116 can then broadcast the recorded data to some viewing location, as discussed with respect to FIG. 10 (for instance, viewing location 1006).

Interestingly, another hang-timer 1120 may also instruct 1118 the camera 1116 when to record. In case there may be a conflict of instructions between any two or more hang-timers 1100 and 1120, an algorithm can be used where instructions are prioritized. For example, the hang-timer 1100 attached to the jumper 1102 can have priority in terms of instructing the ground-based camera 1116 when to record—or vice versa. Alternatively, if one hang-timer 1100 is already instructing a camera 1116, another hang-timer 1120 can instruct 1122 a different camera 1124. Those of skill in the art will appreciated the numerous different combinations and relationships that can exist between hang-timers and cameras.

Figure 12A:
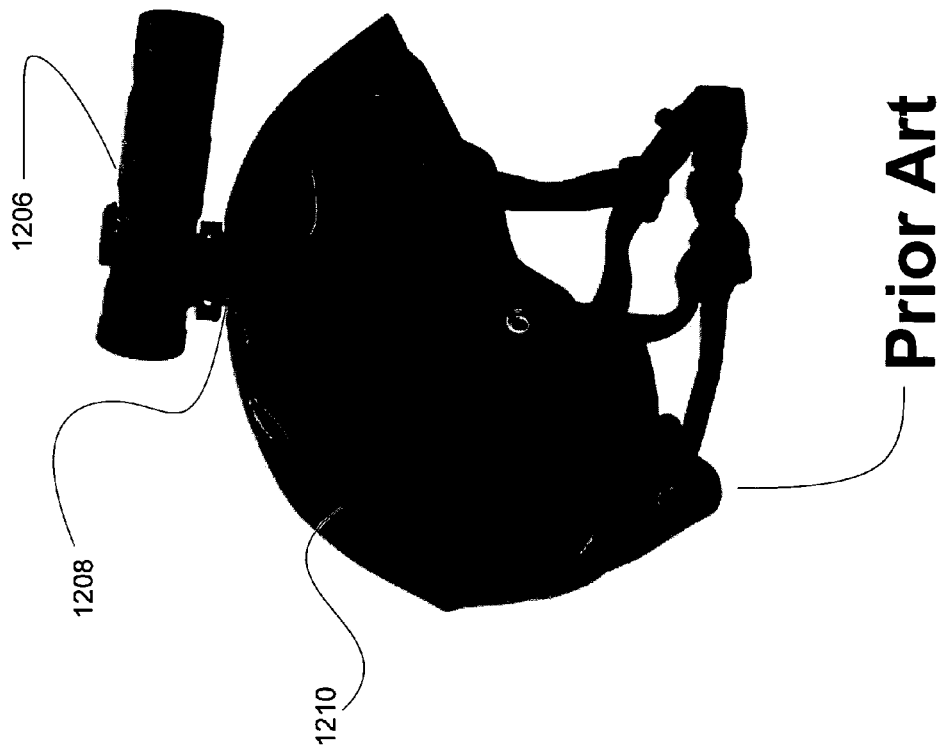
FIG. 12A illustrates exemplary aspects of the hang-timer and the camera, showing that both devices can be attached at various locations.

FIG. 12A illustrates exemplary aspects of the hang-timer and the camera, showing that both devices can be attached just about anywhere. The hang-timer 1200 can have a latching mechanism 1202, such as a carabiner clip, to latch the hang-timer 1200 to a hang-time event jumper—as discussed above with reference to FIGS. 7A-7C. The carabiner clip can be latched to just about anywhere, whether the jumper or a jump vehicle, such as a snowboard. Alternatively, since the hang-timer 1200 has stopwatch capabilities, it can be used to measure a hang-time event by someone holding the hang-timer 1200 on the ground. Moreover, as already indicated above, the hang-timer may also have a securing mechanism 1204 to make sure not only that the hang-timer is securely attached to an appropriate jumper (and not another jumper, or not merely thrown up in the air to record a bogus hang-time), but also to ensure that the camera is recording the proper jumper, if the camera is ground-based, or it is recording the proper jump, if the camera is snowboard-based or jumper-based.

Figure 12A:
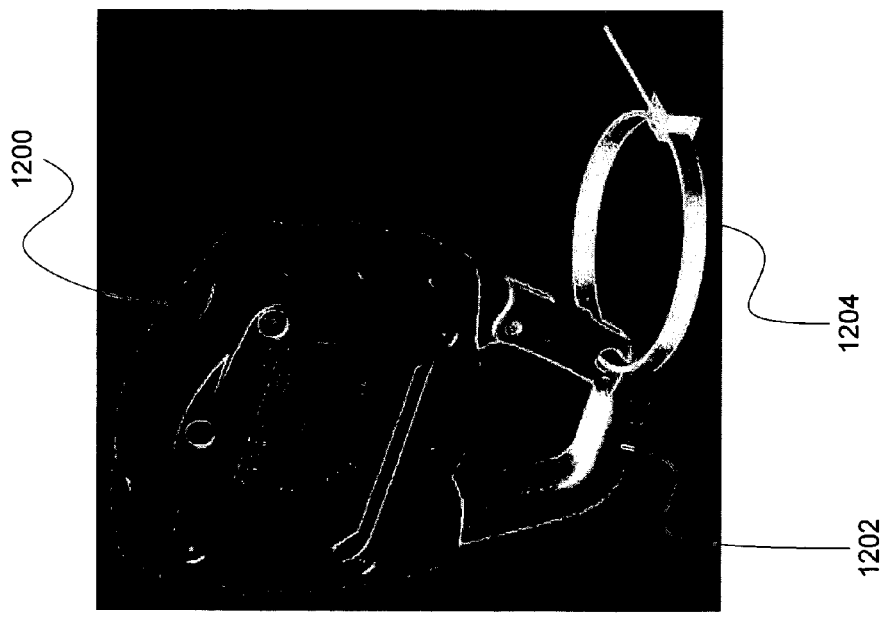

Just as the hang-timer 1200 can be attached anywhere, so can the camera 1206. In FIG. 12, the camera 1206 is attached to a helmet 1210. However, in addition to being helmet-based, as indicated above, it can also be ground-based, ramp-based, snowboard-based, and so on. The camera attaching mechanism 1208 can be universal and adaptable to attach the camera 1206 just about anywhere it can communicate with any given hang-timer, such as the hang-timer 1200 depicted in FIG. 12.

Figure 12B:
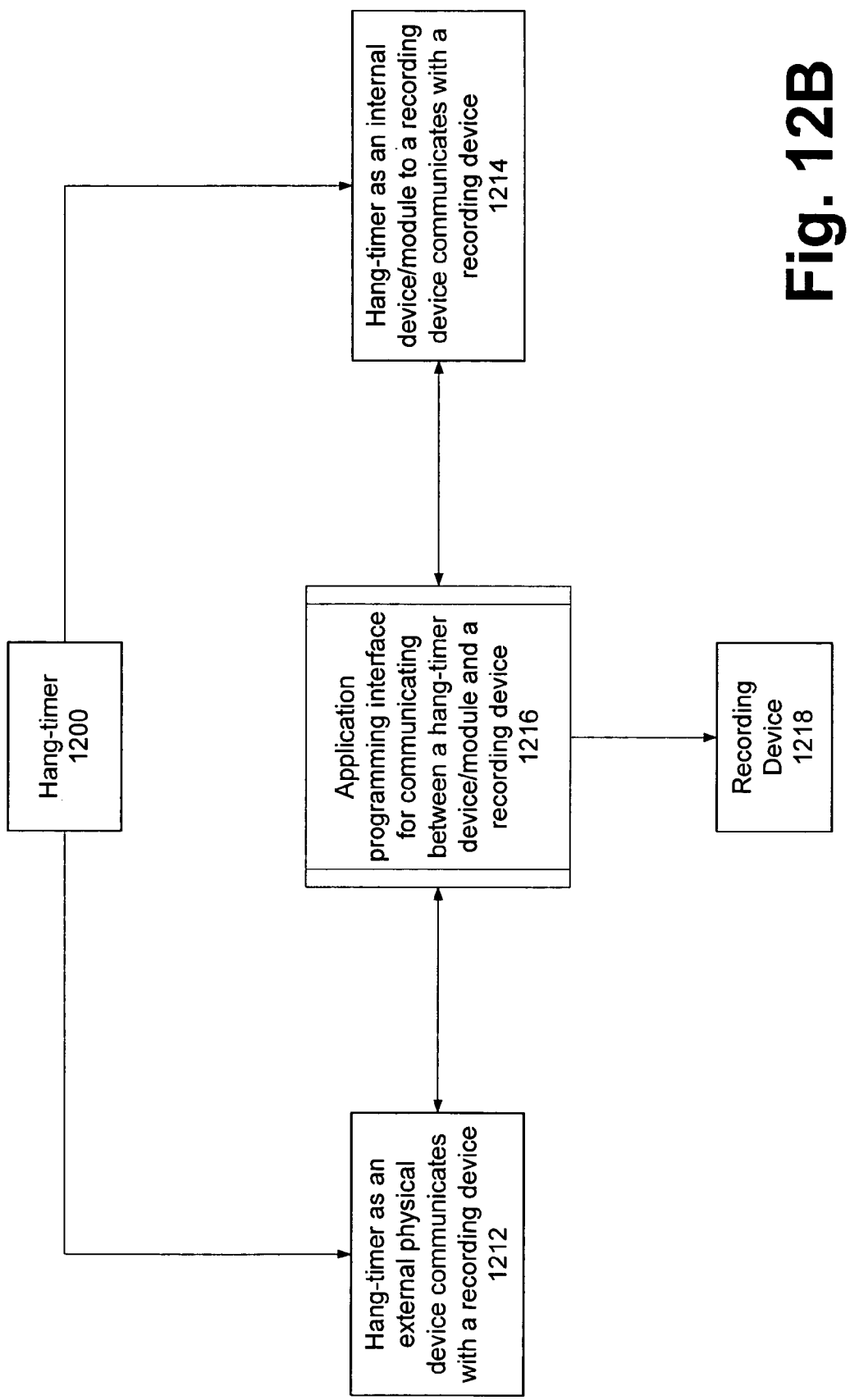
FIG. 12B illustrates the universal location capability of the hang-timer (and its equivalent software functionality) and its relationship to a typical recording device.

FIG. 12B illustrates the universal location capability of the hang-timer (and its equivalent software functionality) and its relationship to a typical recording device. Specifically, at block 1212, the hang-timer 1200 illustrated in FIG. 12A can be located externally vis-à-vis a recording device that it communicates with. This scenario is depicted in FIG. 11, where the hang-timer 1200 may be attached either to the hang-timer wearer, the wearer's vehicle (whether it's a snowboard or a mountain bike), or to some other location from which it may control recording devices.

Conversely, at block 1214, the hang-timer 1200, or more precisely, a modular software component of the hang-timer, can be placed internally in a recording device 1218. In other words, the capability of the hang-timer 1200 to measure hang-time can be used inside a recording device 1218, and hence this capability can be used to control the recording events by the recording device 1218—such as the camera 1206 illustrated in FIG. 12A. Alternatively, the hang-timer 1200 as a hang-time event measuring module, may be contained in a component that interfaces with the recording device 1218 (this component, not pictured, can directly interface with the recording device 1218—such as being directly plugged in with the recording device 1218—or it may interface indirectly with the recording device, as discussed with reference to FIG. 11. In any case, at block 1216, an application programming interface may be used, whether contained in the recording device 1218 or contained in an auxiliary component interfacing with the recording device 1218, in order to facilitate communication between the hang-timer 1200 and the recording device 1218.

Figure 13:
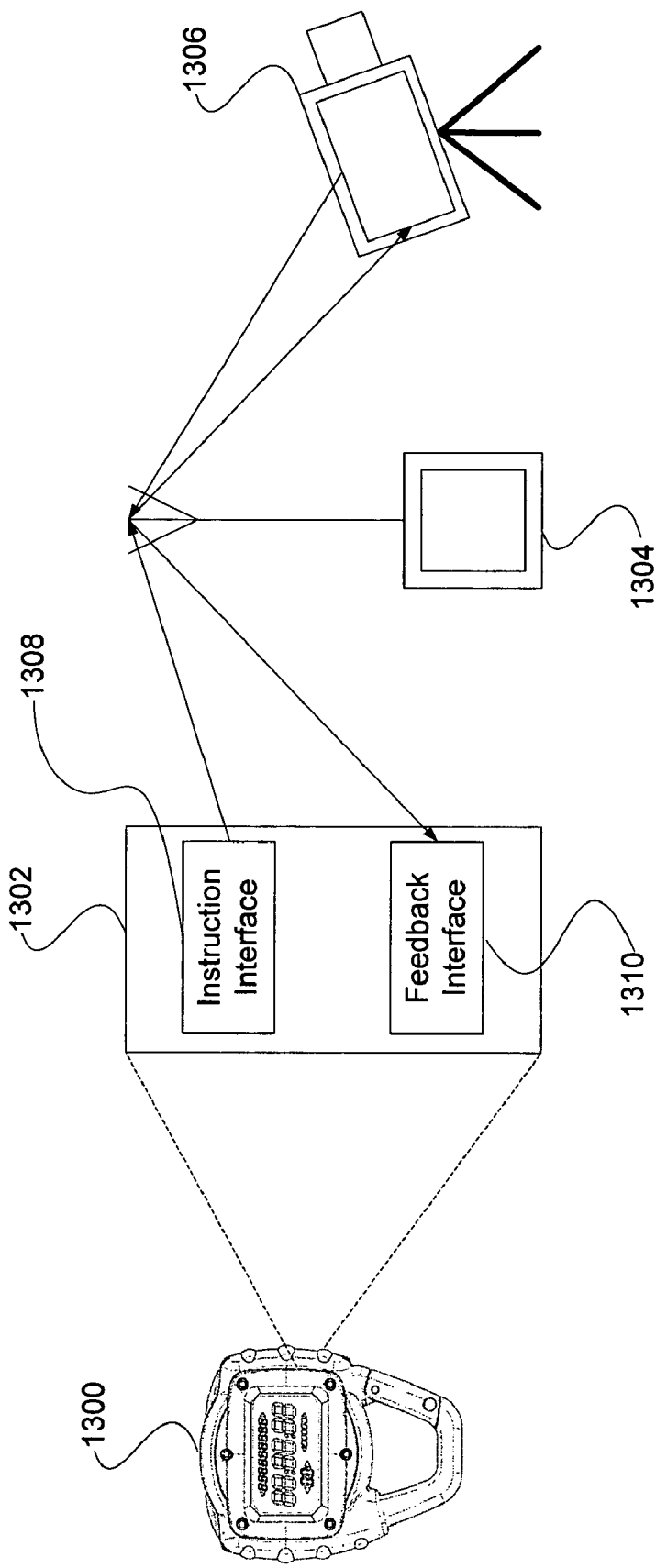
FIG. 13 illustrates that the hang-timer can have an application programming interface (API) that allows the hang-timer to communicate with external devices, such as a camera.

FIG. 13 illustrates that the hang-timer 1300 can have an application programming interface (API) 1302 that allows the hang-timer 1300 to communicate with external devices, such as a camera 1306. The API 1302 can comprise of various interfaces, such as an instruction interface 1308 and a feedback interface 1310. The instruction interface 1308 can provide instructions, either directly (not illustrated) to a camera 1306 or via a receiving or relaying station 1304 to a camera 1306, as illustrated in FIG. 13. Furthermore, through a feedback interface 1310, the hang-timer 1300 can also receive communications. One scenario in which the hang-timer 1300 may employ this interface 1310 is in synchronizing recording sessions with a recording device, as mentioned above.

Figure 14:
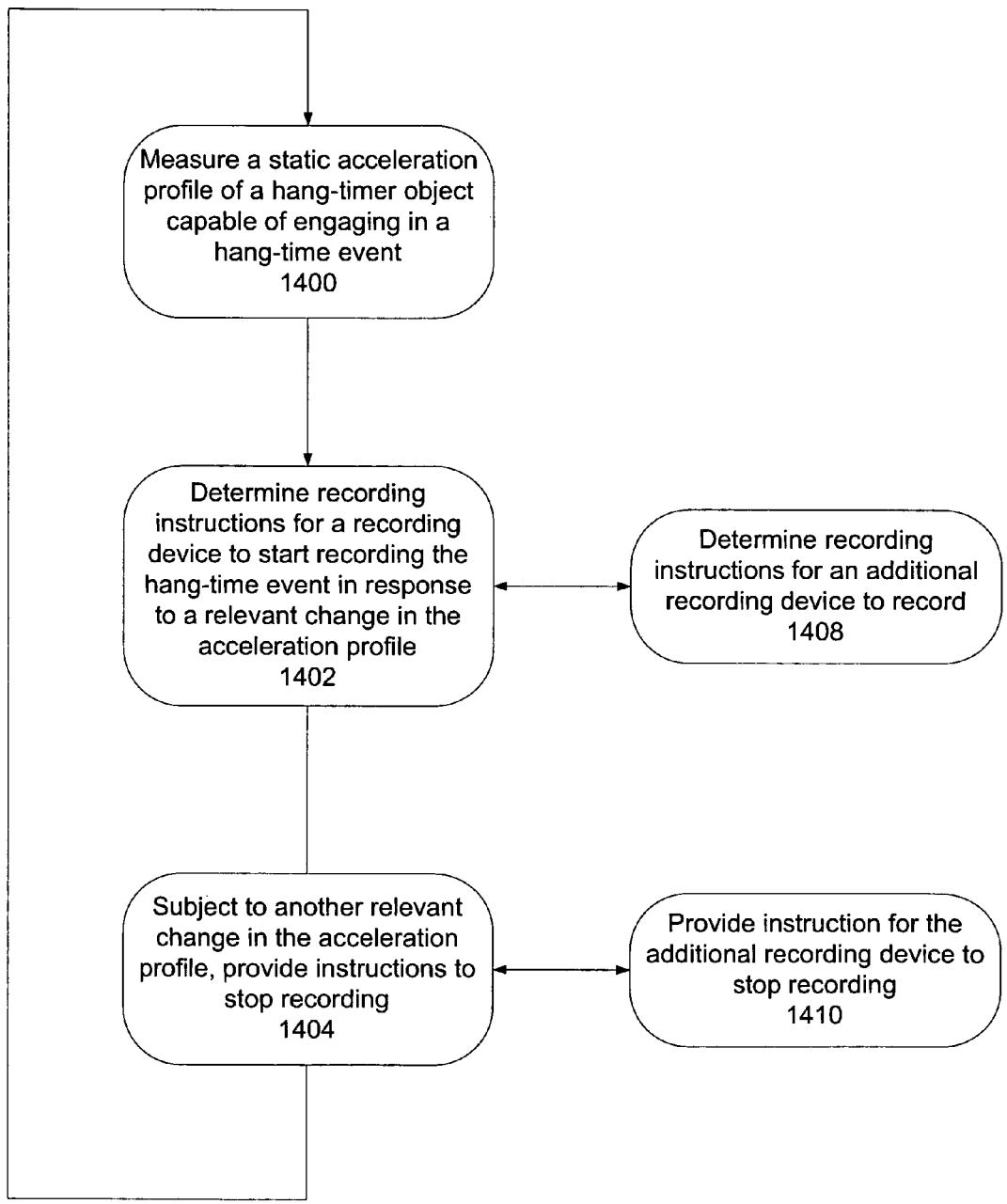
FIG. 14 illustrates one exemplary implementation of the hang-timer configured to provide recording instructions.

FIG. 14 illustrates one exemplary implementation of the presently disclosed subject matter. At step 1400, a hang-timer can measure a static acceleration profile of a hang-timer object that is capable of engaging in a hang-time event. Thus, this step could be otherwise characterized as monitoring the static acceleration profile of a hang-timer wearer.

At step 1402, the hang-timer can determine recording instructions for a recording device, so that the recording device can start recording the hang-timer event. The recording instructions may be determined in response to some relevant change in the acceleration profile of a hang-timer wearer. For example, one such relevant change may be a change in static acceleration of about 1 g or so, from say, about 1 g to about 0 g.

Concurrently to step 1402, in step 1408, the hang-timer can issue instruction to other listening recording devices. These other recording device may also record the hang-time event. Moreover, the instruction provided by the hang-timer may be either the same as instruction provided to the recording device at step 1402, or they may be different and specifically tailored for the additional recording device at step 1408.

At step 1404, subject to another relevant event, such as a change in static acceleration from about 0 g to about 1 g, the hang-timer can provide instructions to stop recording by the recording device. Moreover, such instructions, at step 1410, can also be provided to the additional recording device.

Interestingly enough, the hang-timer can either send out a separate start recording instructions and a separate stop recording instructions, or it may send them together at the same time. In this latter case, since the hang-timer knows that hang-time events typically don't last more than, say, ten seconds, it can upon a change in the acceleration profile send out one set of start and stop recording instructions. Such instructions may instruct a recording device to start recording at time t=0 and to stop recording at t=10, which may be ten seconds after it started recording. Various other combinations of starting to record and stopping to record instructions will be readily appreciated by those skilled in the art.

Lastly, step 1404 loops back to step 1400, since the hang-timer can measure multiple hang-time events. The hang-timer can send out recording instructions as long as it is programmed to do so by a hang-timer user. Alternatively, the hang-timer can be programmed to send out instructions only for a selected subset of hang-time events—however that subset is determined, whether by sequence, by greatest hang-time, etc.

It should be noted that the various techniques described herein may be implemented in connection with hardware or software or, where appropriate, with a combination of both. Thus, the methods and devices of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, a hang-timer was disclosed that can issue instructions to recording devices or modules. However, other equivalent mechanisms to these described aspects are also contemplated by the teachings herein. Therefore, the present disclosure should not be limited to any single aspect, but rather construed in breadth and scope in accordance with the appended claims.

The invention claimed is:

1. A hang-timer device for issuing instructions to a camera, comprising:
    at least one accelerometer configured to measure static acceleration that is used to determine at least one hang-time event, wherein the hang-time event occurs about when the static acceleration is about zero g;
    a microprocessor electrically coupled to the at least one accelerometer, wherein the microprocessor is configured to receive static acceleration data from the at least one accelerometer, and wherein the microprocessor is configured to instruct the camera to at least one of begin the act of recording by the camera and cease the act of recording by the camera at least partly based on the change in static acceleration data;
    a first memory device electrically coupled to the microprocessor, wherein the first memory device is configured to store the static acceleration data, wherein the static acceleration data is accessible to the microprocessor for instructing the camera; and
    a second memory device electrically coupled to the microprocessor, wherein the second memory device is configured to store content recorded by the camera.

2. The device according to claim 1, wherein the microprocessor is further configured to instruct the camera to begin the act of recording a period of time before the hang-time event.

3. The device according to claim 1, wherein the microprocessor is further configured to instruct the camera to cease the act of recording a period of time after the hang-time event.

4. The device according to claim 1, wherein the hang-timer device instructs the camera via a relay component.

5. The device according to claim 1, wherein the hang-timer device instructs the camera wirelessly.

6. The device according to claim 1, wherein the hang-timer device instructs the camera via a wire.

7. The device according to claim 1, wherein the hang-timer device instructs the camera via an application programming interface (API).

8. The device according to claim 1, wherein the hang-timer device is further configured to instruct an additional camera to at least one of begin the act of recording by the additional camera and cease the act of recording by the additional camera.

9. The device according to claim 1, wherein the hang-timer device is configured to instruct the camera at least partly based on altimeter data.

10. A method for issuing instructions to camera using a hang-timer device, comprising:
    measuring a static acceleration profile of a hang-timer object by using at least one accelerometer to measure at least one hang-time event, wherein the hang-time event occurs about when the static acceleration is about zero g;
    determining recording instructions for the camera based at least partly on the change in static acceleration and the hang-time event, wherein the recording instructions comprise of at least letting the camera know when to perform one of begin recording and cease recording;
    providing the instructions to the camera; and
    storing the instructions.

11. The method of claim 10, further comprising providing the instructions to the camera in real time.

12. The method of claim 10, further comprising providing the instructions to the camera and an additional camera.

13. The method according to claim 10, further comprising providing the instructions to the camera via a relay component.

14. The method according to claim 10, further comprising providing the instructions to the camera wirelessly.

15. The method according to claim 10, further comprising providing the instructions to the camera via a wire.

16. The method according to claim 10, further comprising providing the instructions to the camera via an application programming interface (API).

17. The method according to claim 10, further comprising providing instructions that cause the camera to record content a period of time before the hang-time event and a period of time after the hang-time event.

18. An application programming interface (API) for instructing a camera when to record data, comprising:
    an instruction interface for taking an acceleration profile of a hang-timer device for measuring static acceleration data of an object coupled to the hang-timer during a zero g state, and for instructing a camera based on the change in static acceleration data when to record a hang-time event of the object.

19. The device according to claim 1, wherein the camera is configurable to be at least one of attached to a wearer of the hang-timer device and located within reach of the wearer.

20. The device according to claim 1, wherein the camera is configurable to be located on or about the ground when a wearer of the hang-timer device is engaged in a hang-time event.

21. A device for measuring a hang-time of an object, comprising:
- at least one accelerometer configured to measure a static acceleration, wherein the at least one accelerometer determines the static acceleration based on a restraint force experienced by a reference mass in the at least one accelerometer;
- at least one microprocessor configured to determine the hang-time of the object, wherein the hang-time is based on the static acceleration, and wherein the hang-time occurs about when the static acceleration is zero g; and
- at least one memory storage device for storing the hang-time;
- wherein said device is communicatively coupled to a camera for recording content during at least a portion of the hang-time.

22. The device according to claim 21, wherein the device is associated with at least one of a cellular phone and an MP3 player.

* * * * *